US012291021B2

(12) United States Patent
Yoshikawa

(10) Patent No.: US 12,291,021 B2
(45) Date of Patent: May 6, 2025

(54) LIQUID EJECTING DEVICE AND LIQUID EJECTING METHOD

(71) Applicant: SEIKO EPSON CORPORATION, Tokyo (JP)

(72) Inventor: Eishin Yoshikawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 92 days.

(21) Appl. No.: 18/476,375

(22) Filed: Sep. 28, 2023

(65) Prior Publication Data

US 2024/0109338 A1 Apr. 4, 2024

(30) Foreign Application Priority Data

Sep. 30, 2022 (JP) ................................ 2022-157281

(51) Int. Cl.
*B41J 11/00* (2006.01)

(52) U.S. Cl.
CPC .... *B41J 11/00212* (2021.01); *B41J 11/00214* (2021.01)

(58) Field of Classification Search
CPC ............ B41J 11/00212; B41J 11/00214; B41J 11/00218; B41J 2/07; B41J 29/393
See application file for complete search history.

(56) References Cited

U.S. PATENT DOCUMENTS

2017/0057252 A1* 3/2017 Mitsuzawa .............. B41J 2/145

FOREIGN PATENT DOCUMENTS

JP 2005-254560 A 9/2005

* cited by examiner

*Primary Examiner* — Bradley W Thies
(74) *Attorney, Agent, or Firm* — Global IP Counselors, LLP

(57) ABSTRACT

A liquid ejecting device such that, when an emission unit passes above an ejected liquid in a first non-constant velocity period concerning a velocity of movement of a liquid ejecting head and the emission unit, emission is performed at not less than an effective output when a distance between the liquid ejecting head and the emission unit is a first distance. In a second non-constant velocity period that is a non-constant velocity period and in which the relative velocity relative to the medium is faster than that in the first non-constant velocity period, in a case in which the emission unit passes above the ejected liquid, the liquid ejecting device performs control such that emission is performed at not less than an effective output when the distance is a second distance longer than the first distance, and at less than an effective output when the distance is the first distance.

6 Claims, 5 Drawing Sheets

LIQUID EJECTING DEVICE AND LIQUID EJECTING METHOD

The present application is based on, and claims priority from JP Application Serial Number 2022-157281, filed on Sep. 30, 2022, the disclosure of which is hereby incorporated by reference herein in its entirety.

BACKGROUND

1. Technical Field

The present disclosure relates to a liquid ejecting device and a liquid ejecting method.

2. Related Art

Of printers as one type of image recording devices, inkjet recording devices eject, onto a medium, photocurable ink such as ultraviolet (UV) curable ink that is cured when irradiated with ultraviolet light. For example, JP-A-2005-254560 discloses an inkjet recording device including an emission light source provided at both end portions of a head, in which the head is configured to eject UV cure ink while moving in a predetermined direction, and the emission light source of ultraviolet light is configured to move along with the head.

However, an emission light source is configured to emit an active energy beam such as ultraviolet light onto a liquid such as UV cure ink. The liquid is ejected from a liquid ejecting head configured to eject the liquid. The emission light source is moved together with the liquid ejecting head. In this case, the liquid ejecting head and the emission light source accelerate from a state of the velocity 0 to a predetermined movement velocity. Then, the liquid ejecting head and the emission light source decelerate and return to the state of velocity 0 at the end. The liquid ejecting head and the emission light source repeat this operation. In other words, the liquid ejecting head and the emission light source do not always travel at a constant velocity, and can take a plurality of velocities.

As the velocity varies, a period of time that elapses from "ejection of the liquid" to "emission of the active energy beam" also varies among adjacent liquid ejecting heads and the emission light source. Thus, when both the liquid ejecting head and the emission light source move together, a difference in printing quality occurs between different velocity ranges.

For this reason, it is desired to develop a technique that suppresses the occurrence of a difference in printing quality between different velocity ranges when both the liquid ejecting head and the emission light source move together. Note that the technique disclosed in JP-A-2005-254560 cannot solve such a problem.

SUMMARY

A liquid ejecting device according to an aspect of the present disclosure includes a liquid ejecting head configured to eject a liquid to a medium, an emission unit configured to move, together with the liquid ejecting head, in a main scanning direction relative to the medium, and emit an active energy beam toward the medium, and a control unit configured to control emission of the active energy beam from the emission unit, in which a non-constant velocity period represents a period in which a relative velocity of the liquid ejecting head and the emission unit in the main scanning direction relative to the medium changes, the non-constant velocity period includes a first non-constant velocity period, and a second non-constant velocity period in which the relative velocity is faster than the relative velocity in the first non-constant velocity period, when emitting the active energy beam at not less than an effective output, the emission unit emits the active energy beam such that an emission range in a sub-scanning direction intersecting the main scanning direction is constant, in a case in which, in the first non-constant velocity period, the emission unit passes above the liquid ejected from the liquid ejecting head, the control unit performs control such that the active energy beam is emitted from the emission unit at not less than an effective output when a distance between the liquid ejecting head and the emission unit is a first distance, and in a case in which, in the second non-constant velocity period, the emission unit passes above the liquid ejected from the liquid ejecting head, the control unit performs control such that the active energy beam is emitted from the emission unit at not less than an effective output when the distance between the liquid ejecting head and the emission unit is a second distance longer than the first distance, and the active energy beam is emitted from the emission unit at less than an effective output when the distance is the first distance.

A liquid ejecting method according to an aspect of the present disclosure is a liquid ejecting method of ejecting a liquid using a liquid ejecting device, the liquid ejecting device including: a liquid ejecting head configured to eject the liquid to a medium, and an emission unit configured to move, together with the liquid ejecting head, in a main scanning direction relative to the medium, and emit an active energy beam toward the medium, the emission unit being a unit configured such that, when emitting the active energy beam at not less than an effective output, the emission unit emits the active energy beam such that an emission range in a sub-scanning direction intersecting the main scanning direction is constant, a non-constant velocity period representing a period in which a relative velocity of the liquid ejecting head and the emission unit in the main scanning direction relative to the medium changes, the non-constant velocity period including a first non-constant velocity period, and a second non-constant velocity period in which the relative velocity is faster than the relative velocity in the first non-constant velocity period, the liquid ejecting method including: in a case in which, in the first non-constant velocity period, the emission unit passes above the liquid ejected from the liquid ejecting head, performing control such that the active energy beam is emitted from the emission unit at not less than an effective output when a distance between the liquid ejecting head and the emission unit is a first distance, and in a case in which, in the second non-constant velocity period, the emission unit passes above the liquid ejected from the liquid ejecting head, performing control such that the active energy beam is emitted from the emission unit at not less than an effective output when the distance between the liquid ejecting head and the emission unit is a second distance longer than the first distance, and the active energy beam is emitted from the emission unit at less than an effective output when the distance is the first distance.

DESCRIPTION OF EMBODIMENTS

Below, embodiment according to the present disclosure will be described with reference to the drawings.

Figure 1:
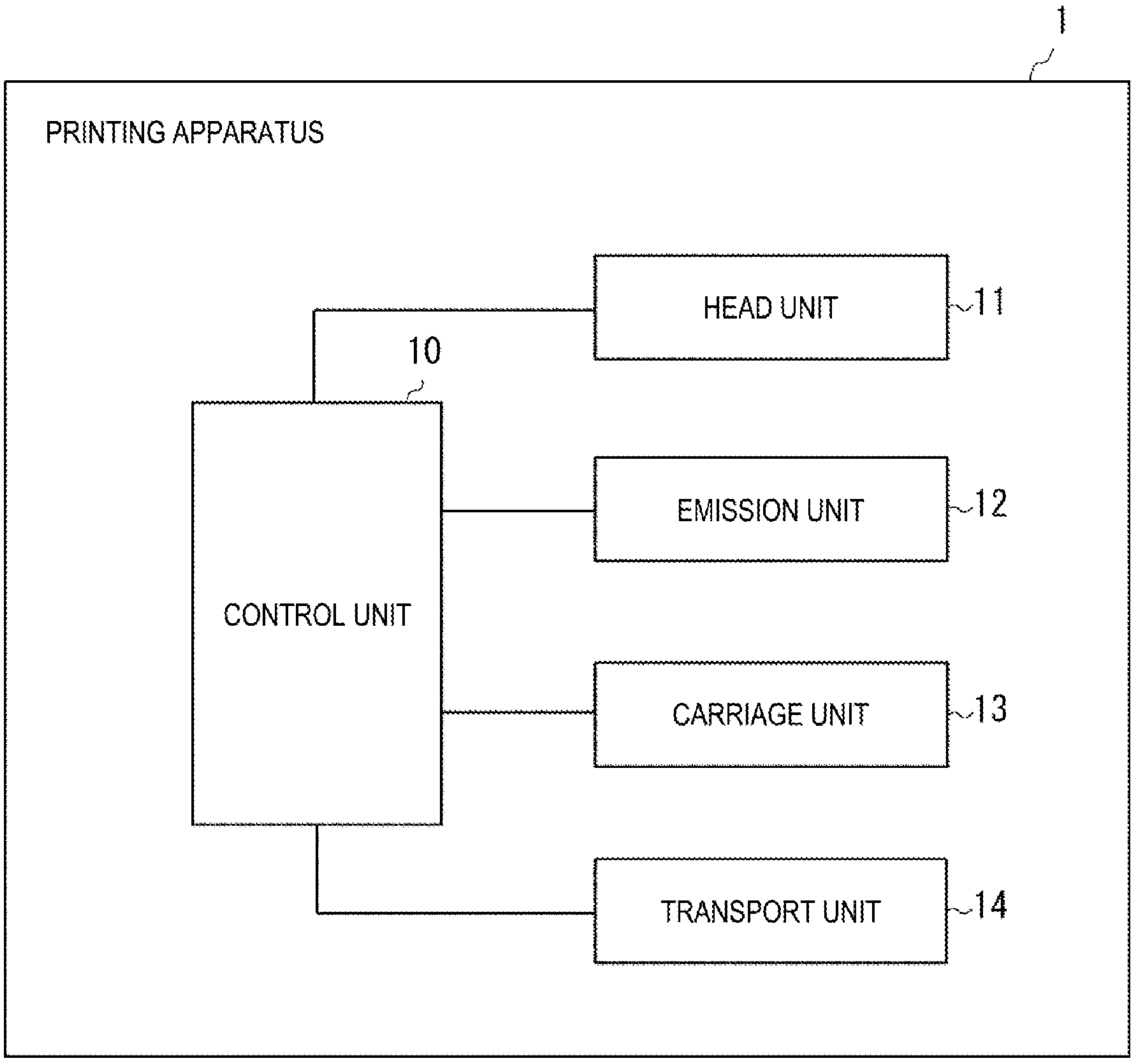
FIG. 1 is a block diagram illustrating one example of a printing apparatus including a liquid ejecting device according to an embodiment.
Figure 2:
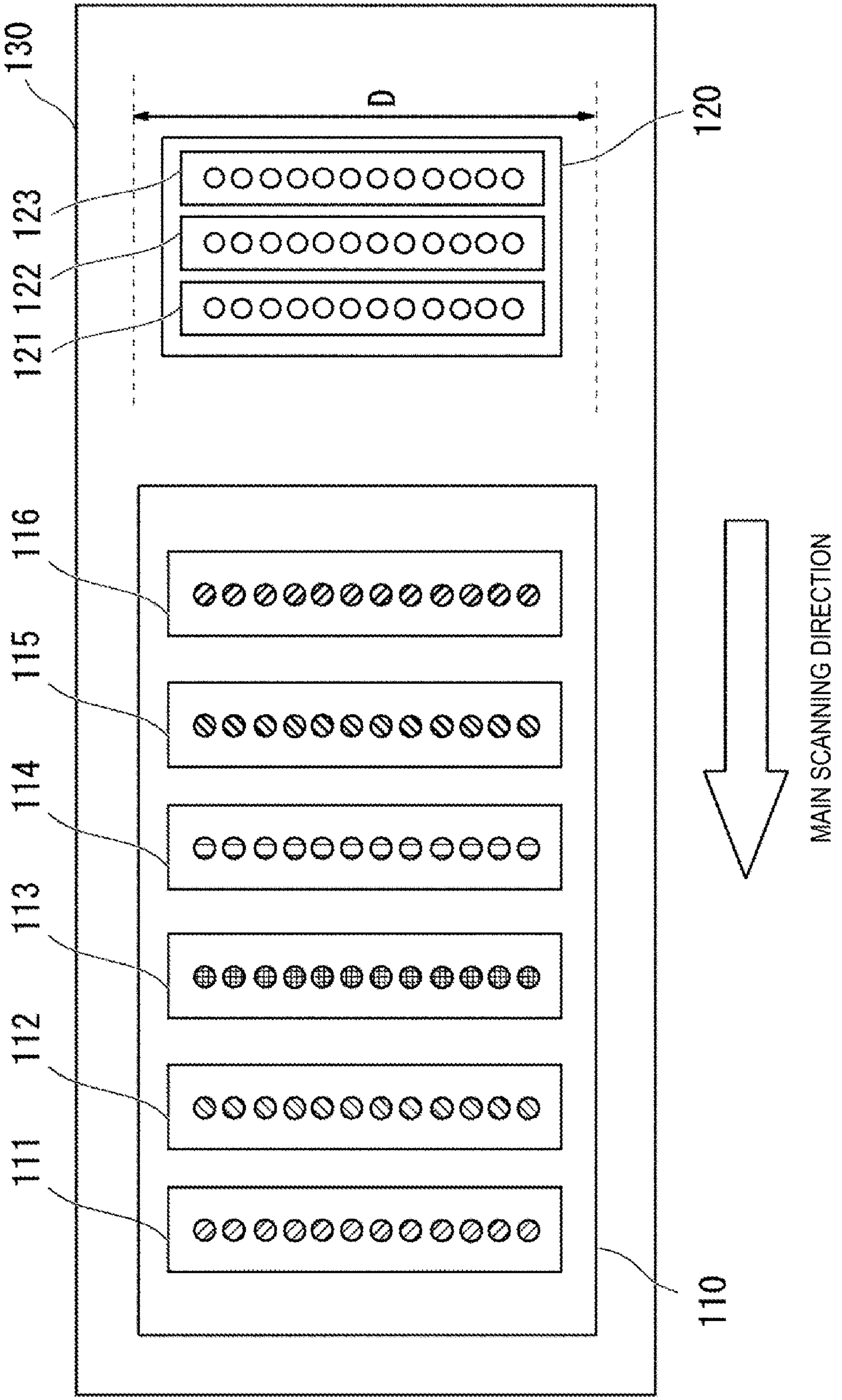
FIG. 2 is a schematic view illustrating one example of a carriage on which a liquid ejecting head and an emission unit in the printing apparatus in FIG. 1 are mounted.

FIG. 1 is a block diagram illustrating one example of a printing apparatus including a liquid ejecting device according to the embodiment. FIG. 2 is a schematic view illustrating one example of a carriage on which a liquid ejecting head and an emission unit in the printing apparatus in FIG. 1 are mounted.

The printing apparatus 1 illustrated in FIG. 1 serves as one example of an image recording device, and typically, is a UV inkjet printer configured to eject UV cure ink to a medium such as a sheet, cloth, or a film to cure the ink. Note that the UV cure ink (hereinafter, referred to as UV ink) is one type of photocurable ink and is ink including ultraviolet light curable resin. The UV ink is cured through a photopolymerization reaction occurring at the ultraviolet light curable resin.

However, the liquid used in the printing apparatus 1 is not limited to the UV cure ink, and it may be possible to use a liquid that reacts to an active energy beam other than the ultraviolet light such as light having other wavelength bands or an electron beam to change. That is, the printing apparatus 1 may be configured as another type of image recording device configured to eject such a liquid to the medium and cure the liquid with the active energy beam to fix the liquid on the medium. In addition, the present embodiment can be broadly applied to devices using an inkjet technique such as copy machine, a facsimile device, or a multifunction device having functions of these devices.

A computer (not illustrated) can be coupled to the printing apparatus 1 in a wired manner or wireless manner in a way that they can communicate with each other. This computer outputs, to the printing apparatus 1, print data used to cause the printing apparatus 1 to print an image. The printing apparatus 1 that receives this print data performs printing on the medium.

The printing apparatus 1 illustrated in FIG. 1 includes a control unit 10, and also can include a head unit 11, an emission unit 12, a carriage unit 13, and a transport unit 14. It is possible to configure one example of a liquid ejecting device according to the present embodiment by mainly using the head unit 11, the emission unit 12, and a portion of the control unit 10 that relates to control of the head unit 11 and the emission unit 12 from among the printing apparatus 1.

The control unit 10 can also be referred to as a controller, and controls the printing apparatus 1. It may be possible to configure the control unit 10 so as to include, for example, an arithmetic processing device such as a central processing unit (CPU) or a graphics processing unit (GPU), a memory for works, a storage device configured to store programs and parameters for control, and the like. It may be possible to configure the control unit 10 as a system on a chip (SoC). As can be understood from these examples, it may be possible that the control unit 10 is configured to store a control program, so as to be able to execute them. However, it may also be possible to configure the control unit 10 so as to store the control programs as a circuit configuration such as a field-programmable gate array (FPGA), or configure the control unit 10 as a dedicated circuit. It may be possible that the programs described above include a program used to control ejection of a liquid and emission of light in a manner described below.

Note that the printing apparatus 1 may include a group of detectors (not illustrated). The group of detectors makes it possible to monitor situations within the printing apparatus 1, and enables the control unit 10 to control individual units based on the results of detection by the detectors.

The head unit 11 is configured to eject UV ink to the medium, and includes an ink ejecting head configured to eject the UV ink. This ink ejecting head serves as one example of a liquid ejecting head, and in the following description, the ink ejecting head 110 in FIG. 2 is given as an example. A plurality of nozzle rows are formed at the lower surface of the ink ejecting head 110. In the nozzle rows, nozzles configured to eject the UV ink are arrayed at predetermined intervals in the transport direction. Note that this predetermined interval is referred to as a nozzle pitch.

The ink ejecting head 110 is configured to eject six colors of UV ink. Here, description will be made on the assumption that the UV ink that the ink ejecting head 110 can eject include yellow, magenta, cyan, black, white, and transparent ink. Note that the transparent ink is ink used to provide a feeling of gloss. In this case, a yellow nozzle row 111 configured to eject yellow ink, a magenta nozzle row 112 configured to eject magenta ink, and a cyan nozzle row 113 configured to eject cyan ink are formed at the ink ejecting head 110. In addition, a black nozzle row 114 configured to eject black ink, a white nozzle row 115 configured to eject white ink, and a transparent nozzle row 116 configured to eject transparent ink are also formed at the ink ejecting head 110.

Of course, the ink is not limited to these examples. It may be possible to use ten colors of ink in which light cyan, light magenta, gray, and red are added to the examples in FIG. 2, or it may be possible to use ink of four colors of cyan, magenta, yellow, and black. In this manner, it is possible to use any colors of ink and any number of inks, provided that an image having desired image quality can be printed on the medium. Furthermore, as for ink such as black ink of which frequency of use is high, a plurality of nozzle rows may be formed for each color of the ink.

Note that the nozzle for each of the colors communicates with an ink chamber filled with ink of a corresponding color, and is supplied with the ink of the corresponding color from the corresponding ink chamber. As for the method of ejecting ink from the nozzles, it may be possible to employ a piezo method in which a voltage is applied to a drive element (piezo element) to expand and contract the ink chamber to eject the ink from the nozzles. Alternatively, it may be possible to employ a thermal method in which a heat generating element is used to generate air bubbles within the nozzle, and with the air bubbles, the ink is ejected from the nozzle.

The emission unit 12 is configured to emit ultraviolet light toward the medium to irradiate UV ink on the medium with the ultraviolet light to cure the UV ink, and corresponds to an example of an emission unit. The emission unit 12 includes a light source used to emit ultraviolet light. In the following description, a light source 120 illustrated in FIG. 2 is used as an example of this light source. As for the light source 120 used to emit ultraviolet light, it may be possible to use, for example, a light-emitting diode (LED), a metal halide lamp, a mercury lamp, or the like. However, an LED may be used from the viewpoint of the rising speed and capability of fine adjustment of output. Note that the amount of emission of ultraviolet light per unit area of the light source 120, that is, the emission energy is determined by the product of the intensity of emission of ultraviolet light and the emission time.

The carriage unit 13 is a unit configured to move the head unit 11 and the emission unit 12 in a width direction of the medium. The width direction of the medium, that is, a direction in which the head unit 11 and the emission unit 12 are moved at the carriage unit 13 can be referred to as a main scanning direction. In order to achieve this movement, the carriage unit 13 includes a carriage on which the head unit 11 and the emission unit 12 are mounted. Hereinafter, a carriage 130 illustrated in FIG. 2 is given as an example of this carriage. In this manner, the printing apparatus 1 is a serial-type printing apparatus configured to eject the ink while the carriage 130 is being moving in the width direction of the medium.

The ink ejecting head 110 and the light source 120 are mounted at the carriage 130 illustrated in FIG. 2. In addition to the carriage 130, the carriage unit 13 can include a guide rail (not illustrated) functioning as a guide used to cause the carriage 130 to move in the main scanning direction, and also include a movement mechanism configured to move the carriage 130 in the main scanning direction along the guide rail. In this manner, the carriage 130 is configured to be able to move in the width direction of the medium, that is, in the main scanning direction in a state where the ink ejecting head 110 and the light source 120 are mounted thereon. In other words, the emission unit 12 includes the light source 120, and together with the ink ejecting head 110, is able to move in the main scanning direction relative to the medium.

Note that, since the printing apparatus 1 employs a serial type, the lengths of the ink ejecting head 110 and the light source 120 in the width direction that is a direction perpendicular to the transport direction of the medium are each shorter than the width of the medium. In order to make it possible to perform printing throughout the width direction of the medium, the ink ejecting head 110 and the light source 120 are mounted at the carriage 130 and are moved in the width direction of the medium.

For the purpose of simplification of explanation, description will be made of an example in which the printing apparatus 1 is a device configured to perform printing only when the carriage 130 is moved in a direction indicated by the arrow in FIG. 2 of the main scanning direction. In particular, description will be made such that the direction of the arrow is a direction of the forward path. However, the opposite direction may be set as the forward path. When the carriage 130 moves in the direction of the arrow in FIG. 2, that is, during the forward path in which the carriage 130 moves from the right side to the left side in the main scanning direction, the UV ink ejected from the ink ejecting head 110 is irradiated with the ultraviolet light from the light source 120 disposed at the right side in the movement direction. Of course, the printing apparatus 1 can be configured as a device in which printing is performed during the returning path in which the carriage 130 moves in the reverse direction, in addition to during the forward path. This example will be briefly described later.

The light source 120 is provided at the rear side of the carriage 130 in the forward path of the main scanning direction as illustrated in FIG. 2, and together with the ink ejecting head 110, moves in the direction of the arrow in FIG. 2 in association with movement of the carriage 130. The UV ink ejected from the ink ejecting head 110 during the movement in the movement direction in the forward path is irradiated with the ultraviolet light from the light source 120 immediately after the UV ink lands on the medium. However, the present embodiment is characterized in control concerning emission of ultraviolet light from the light source 120 after the UV ink lands on the medium. This characteristic will be described later.

The transport unit 14 is configured to feed the medium to a position where printing can be performed, and during printing, also transport the medium by a predetermined amount of transport in the transport direction. For example, it may be possible to configure the transport unit 14 using a roller and a motor or the like configured to drive the roller.

The printing apparatus 1 having such a configuration repeats an ejection operation, a movement operation, and a transport operation. In the ejection operation, the control unit 10 causes ink to be ejected from the ink ejecting head 110 while causing the carriage 130 to move the ink ejecting head 110 and the light source 120 in the main scanning direction in the forward path. In the movement operation, the ink ejecting head 110 and the light source 120 are moved in the reverse direction in the returning path. In the transport operation, the medium is transported in the transport direction relative to the ink ejecting head 110 and the light source 120. Thus, at a position on the medium that differs from a position of a dot formed through the previous ejection operation, a dot is formed through the subsequent ejection operation, and hence, two-dimensional image is printed (recorded) on the medium.

Figure 3:
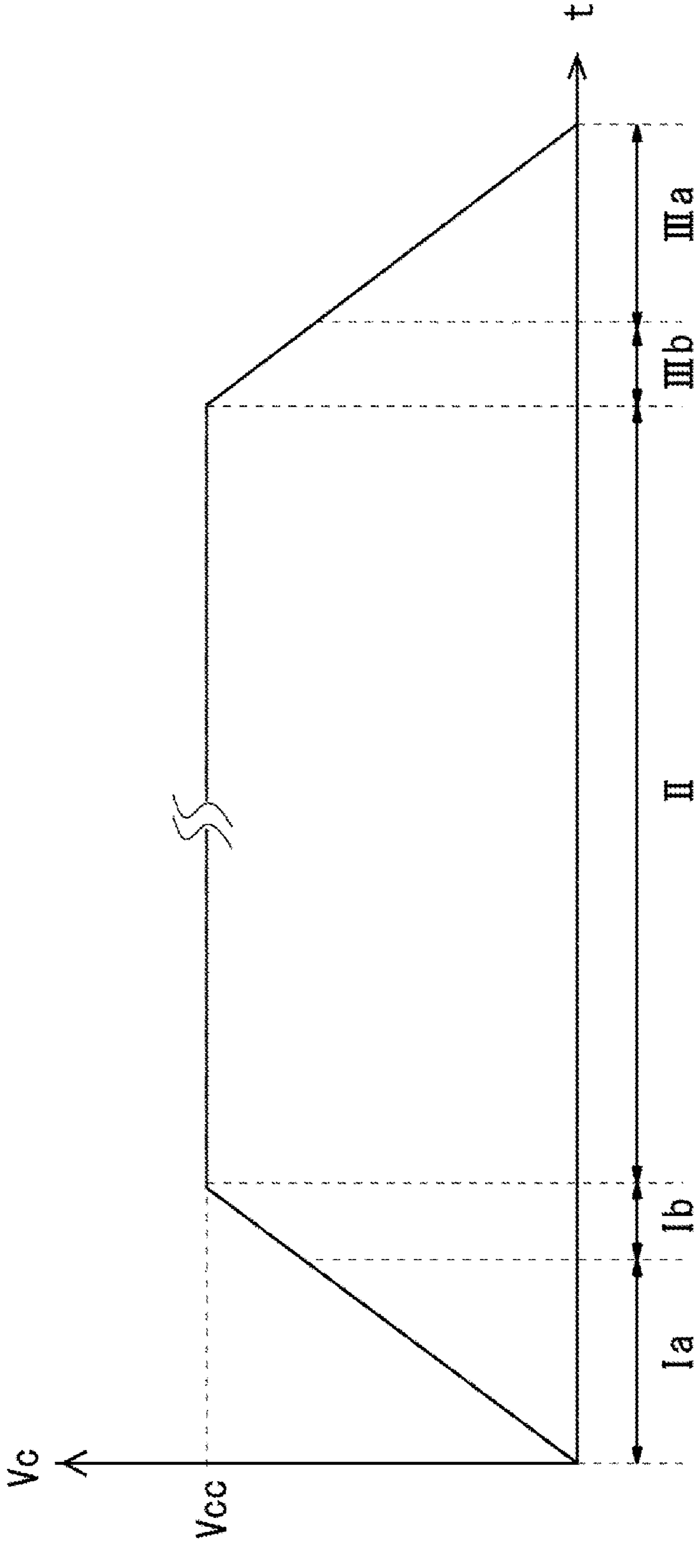
FIG. 3 is a graph showing one example of a change in a velocity of movement of a carriage in one forward path of the printing apparatus in FIG. 1.

Below, with reference to FIG. 3, description will be made of controlling concerning emission of ultraviolet light from the light source 120 after the UV ink lands on the medium, which is a main characteristic of the present embodiment. FIG. 3 is a graph showing one example of a change in a velocity of movement of a carriage in one forward path of the printing apparatus in FIG. 1. In FIG. 3, the horizontal axis indicates the time t, and the vertical axis indicates a carriage velocity Vc.

The printing apparatus 1 according to the present embodiment uses a linear type encoder to detect a carriage velocity Vc that is the velocity of movement, in the movement direction, of the carriage 130 on which the ink ejecting head 110 and the light source 120 are mounted. The linear type encoder is an encoder used to detect the position of the carriage 130 in the movement direction, and can include a linear scale and a detector provided at the back surface of the carriage 130 so as to be opposed to the linear scale, although illustration is not given.

The time T from when the detector detects a certain slit at the linear scale to when the detector detects the next slit corresponds to a period of time when the carriage 130 moves a slit interval λ in the movement direction. Note that the slit interval λ can be, for example, 180 dpi or the like. Thus, the carriage velocity Vc ($=\lambda/t$) can be obtained by dividing the slit interval λ by the time interval T at which the detector detects slits.

In order to improve the printing quality, the carriage 130 may always be moved at a constant velocity at least during ejection of ink. However, the carriage velocity Vc needs to be at zero between the forward path and the returning path. This necessitates a non-constant velocity period in addition to a constant velocity period II that is a period of time when movement is made at a constant velocity. Here, the constant velocity period represents a period of time when a relative velocity of the ink ejecting head 110 and the light source 120 in the main scanning direction relative to the medium is constant. The non-constant velocity period represents a period of time when the relative velocity described above changes.

Thus, in the non-constant velocity period, the control unit 10 changes the relative velocity of the carriage 130 relative to the medium in accordance with a predetermined acceleration curve. The control unit 10 performs control such that the carriage velocity Vc gradually increases from a state where the carriage 130 is at rest, and once the carriage velocity Vc reaches a specified velocity Vcc, the carriage 130 moves at the constant velocity Vcc in the constant velocity period II. Then, the control unit 10 causes the carriage velocity Vc to gradually reduce from a state where the carriage 130 moves at the constant velocity Vcc, and stops the carriage 130.

For example, in the acceleration curve described above, the relative velocity can be gently reduced as the time approaches the constant velocity period II and, after the constant velocity period, gently increased as the time elapses from the constant velocity period. However, the acceleration curve is not limited to such an example, and the acceleration curve can include a constant acceleration in a portion of the period. For the purpose of simplification of explanation, FIG. 3 shows an example in which the degree of acceleration during acceleration in the non-constant velocity period and the degree of acceleration during deceleration in the non-constant velocity period are each constant.

In addition, in order to reduce the width of the printing apparatus 1 in the main scanning direction as much as possible, it is necessary to perform printing not only in the constant velocity period II but also in a non-constant velocity period other than the constant velocity period II. However, a dot that has landed keeps expanding from when the UV ink lands to when ultraviolet light is emitted to cure the UV ink. This creates a difference in dot diameter between a dot that is rapidly cured immediately after landing and a dot that is cured after a certain period of time elapses after landing. In addition, the difference in dot diameter caused in this manner means that the printing quality also varies according to a difference in landing time. In particular, both the ink ejecting region and the light source that emits ultraviolet light move at the same velocity and for the same relative distance, as with the case where both the nozzle row configured to eject the UV ink and the light source 120 configured to cause the UV ink to be cured are mounted at the carriage 130. In such a case, the image quality deteriorates due to the reason described above between a region where the carriage 130 accelerates and decelerates and a region where the velocity is constant.

In order to reduce such a deterioration in image quality, the present embodiment performs control concerning emission of ultraviolet light from the light source 120 after the UV ink lands on the medium. In association with this control, description will be made on the assumption that the non-constant velocity period described above includes a first non-constant velocity period, and a second non-constant velocity period in which the relative velocity described above is faster than that in the first non-constant velocity period. In the example in FIG. 3, in order to describe this control, there are five periods in terms of the carriage velocity Vc. These five periods are: a first non-constant velocity period Ia during acceleration from the velocity 0; a subsequent second non-constant velocity period Ib; a constant velocity period II; a second non-constant velocity period IIIb during deceleration from the constant velocity period II; and a subsequent first non-constant velocity period IIIa toward the velocity 0.

Note that the non-constant velocity period, the first non-constant velocity period, the second non-constant velocity period, and the constant velocity period each correspond to a region (range of location) where the source of emission of the light source 120 is physically located in the respective periods. Here, it is possible that the source of emission of the light source 120 represents an original light source that performs emission at an effective output or more at the light source 120, and the effective output represents an output effective in curing the ink with the period of time of emission being taken into consideration.

Furthermore, it is only necessary that the ratio between the first non-constant velocity period Ia and the second non-constant velocity period Ib is determined based on various factors including, for example, an acceleration curve, the degree of the desired image quality, and the like. For example, the ratio can be set to 7:3. However, the ratio is not limited to this, and may be set to 9:1 or the like. Note that this similarly applies to the ratio between the first non-constant velocity period IIIa and the second non-constant velocity period IIIb.

Below, for the purpose of simplification of explanation, description will not be made of control in the second non-constant velocity period IIIb during deceleration or the first non-constant velocity period IIIa during deceleration. However, the description above similarly applies to these periods. The first non-constant velocity period IIIa during deceleration and the second non-constant velocity period IIIb during deceleration correspond to the first non-constant velocity period Ia during acceleration and the second non-constant velocity period Ib during acceleration, respectively. The acceleration curve during acceleration and the deceleration curve during deceleration may be set to differ from each other. Note that the second non-constant velocity period IIIb and the first non-constant velocity period IIIa can be referred to as a third non-constant velocity period and a fourth non-constant velocity period, respectively. However, these names are merely used for the purpose of convenience.

As described above, a time difference between landing of a dot and emission occurs between the first non-constant velocity period Ia, the second non-constant velocity period Ib, and the constant velocity period II. In order to reduce this difference, the control unit 10 according to the present embodiment controls emission of ultraviolet light from the emission unit 12 in the following manner.

That is, in the printing apparatus 1, the light source 120 includes a plurality of light sources disposed such that the distances thereof from the ink ejecting head 110 in the main scanning direction differ from each other as illustrated in FIG. 2, and the control unit 10 can control drive of the plurality of light sources at the emission unit 12. This control is performed to cause the time difference between landing of a dot and emission to correspond to a change in the carriage velocity Vc.

FIG. 2 illustrates an example in which three light sources of a first light source 121, a second light source 122, and a third light source 123, which serve as the plurality of light sources described above, are disposed such that the distances thereof from the ink ejecting head 110 in the main scanning direction differ from each other. However, the number of disposed light sources and the difference in the distances from each other are not limited to those in the example in the drawing.

By providing two light sources as the plurality of light sources, the difference described above can be controlled for emission in the first non-constant velocity period Ia and emission in the second non-constant velocity period Ib, or for emission common to the first non-constant velocity period Ia and the second non-constant velocity period Ib and emission in the constant velocity period II. In this manner, the number of the plurality of light sources is not limited to three, and may be equal to the number of periods for controlling the difference described above. Thus, the number of light sources may be four or more.

The first light source 121, the second light source 122, and the third light source 123 serve as one example of a first emission unit, a second emission unit, and a third emission unit, respectively, and are located at a first distance, a second distance, and a third distance, respectively, from the ink ejecting head 110 in the main scanning direction. Here, the second distance is longer than the first distance, and the third distance is longer than the first distance and the second distance. Note that a difference between the first distance, the second distance, and the third distance can be determined, for example, based on the acceleration curve of the carriage velocity Vc, the constant velocity Vcc, the material of the UV ink, the amount of emission of light source, or the like.

However, when emitting ultraviolet light at the effective output or more, the emission unit 12 is configured to emit the ultraviolet light such that an emission range in a sub-scanning direction intersecting the main scanning direction, that is, the emission range in the transport direction of the medium is constant. In a case of the example in FIG. 2, the first light source 121, the second light source 122, and the third light source 123 are each disposed such that positions on the medium that correspond to the emission range indicated as D in FIG. 2 exist in the same range in the sub-scanning direction. That is, all the first light source 121, the second light source 122, and the third light source 123 are disposed at the position equal in the sub-scanning direction. Of course, the positions on the medium that correspond to the emission range indicated as D in FIG. 2 exist in a range larger than the range where dots from the ink ejecting head 110 land on the medium.

Then, in a case in which, in the first non-constant velocity period Ia, the light source 120 of the emission unit 12 passes above the UV ink ejected from the ink ejecting head 110, the control unit 10 performs control such that ultraviolet light is emitted from the light source 120 at the effective output or more when the distance between the ink ejecting head 110 and the light source 120 is the first distance. In other words, at this time, control is performed such that the ultraviolet light is emitted from the first light source 121 at the effective output or more. In addition, at this time, the output of emission at the second distance or the third distance does not substantially affect curing of ejected ink, and hence, it does not matter whether the second light source 122 or the third light source 123 is turned on or off. Of course, at the time of performing such control, in order to substantially prevent curing of the ejected ink from being affected by the output of emission at the second and third distances, the first light source 121, the second light source 122, and the third light source 123 are each disposed such that emission ranges of these light sources do not overlap at positions of ejection of the ink.

Meanwhile, in a case in which, in the second non-constant velocity period Ib, the light source 120 passes above the UV ink ejected from the ink ejecting head 110, the control unit 10 performs control such that ultraviolet light is emitted from the light source 120 at the effective output or more when the distance between the ink ejecting head 110 and the light source 120 is the second distance, and ultraviolet light is emitted from the light source 120 at less than the effective output when the distance is the first distance. In other words, at this time, control is performed such that the ultraviolet light is emitted from the second light source 122 at the effective output or more and the ultraviolet light is emitted from the first light source 121 at less than the effective output. In this case, the output of emission at the third distance does not substantially affect curing of ejected ink, and hence, it does not matter whether the third light source 123 is turned on or off.

Here, the emission of the ultraviolet light at less than the effective output means that the emission does not contribute to curing of the UV ink. In order to emit the ultraviolet light at less than the effective output, it may be possible to turn off drive of the target light source, or it may be possible to drive the target light source at a small output to the extent that the UV ink is not cured. The latter drive is drive used as stand-by until the next turning-on. This makes it possible to rapidly turn on at the time of emission.

As described above, the present embodiment deals with the case where the velocity of movement of the carriage 130 is faster and a dot is cured with the light source 120 immediately after landing, and the case where the velocity of movement described above is slower and it takes time for a dot to be cured with the light source 120 after landing. In addition, the distance between the ink ejecting head 110 and the light source 120 is increased to be longer in a range where the velocity of movement described above is faster. Thus, in the present embodiment, a period of time from landing of a dot to the curing can get closer in these cases. This makes it possible to reduce a difference in image quality between individual velocity ranges.

Furthermore, the third light source 123 may not be provided in the manner described above. However, with the third light source 123 being provided, a similar effect can be achieved in the second non-constant velocity period Ib and the constant velocity period II in which the velocity is faster than that in the second non-constant velocity period Ib.

In other words, the control unit 10 performs control such that, in the first non-constant velocity period Ia, at least the first light source 121 emits the ultraviolet light at the effective output or more. At this time, there is no limitation on the control of the second light source 122 and the third light source 123. Furthermore, the control unit 10 performs control such that, in the second non-constant velocity period Ib, the first light source 121 does not emit the ultraviolet light and at least the second light source 122 emits the ultraviolet light. At this time, there is no limitation on the control of the third light source 123. In addition, the control unit 10 performs control such that, in the constant velocity period II, the third light source 123 emits the ultraviolet light at the effective output or more. At this time, the first light source 121 and the second light source 122 are controlled so as to emit the ultraviolet light at less than the effective output.

In this manner, in the constant velocity period II, emission of the light source 120 is also controlled, and positions of the light sources are gradually changed, which makes it possible to further deal with a change in the velocity to reduce a difference in the quality of image.

Next, another example of control of emission of the ultraviolet light will be described. The example described here is configured such that a light source **120*a*, which is an example of replacement for the light source 120, is provided as illustrated in FIG. 4, and this light source 120***a* is able to move in the main scanning direction.

Specifically, the printing apparatus 1 includes a changing unit controlled by the control unit 10 and configured to change the distance between the ink ejecting head 110 and the light source 120*a* in the main scanning direction, and changes this distance under control from the control unit 10. In other words, in the example in FIG. 4, controlling the emission of the ultraviolet light from the emission unit 20 includes controlling the changing unit. The changing unit described above can be referred to as a movement unit as the changing unit allows movement to change the distance between the ink ejecting head 110 and the light source 120*a*.

More specifically, the changing unit can include a rail 15 used to slide and move the light source 120*a* in the main scanning direction, a driving source such as a motor configured to drive and move the light source 120*a* on the rail 15, and the like.

Figure 4:
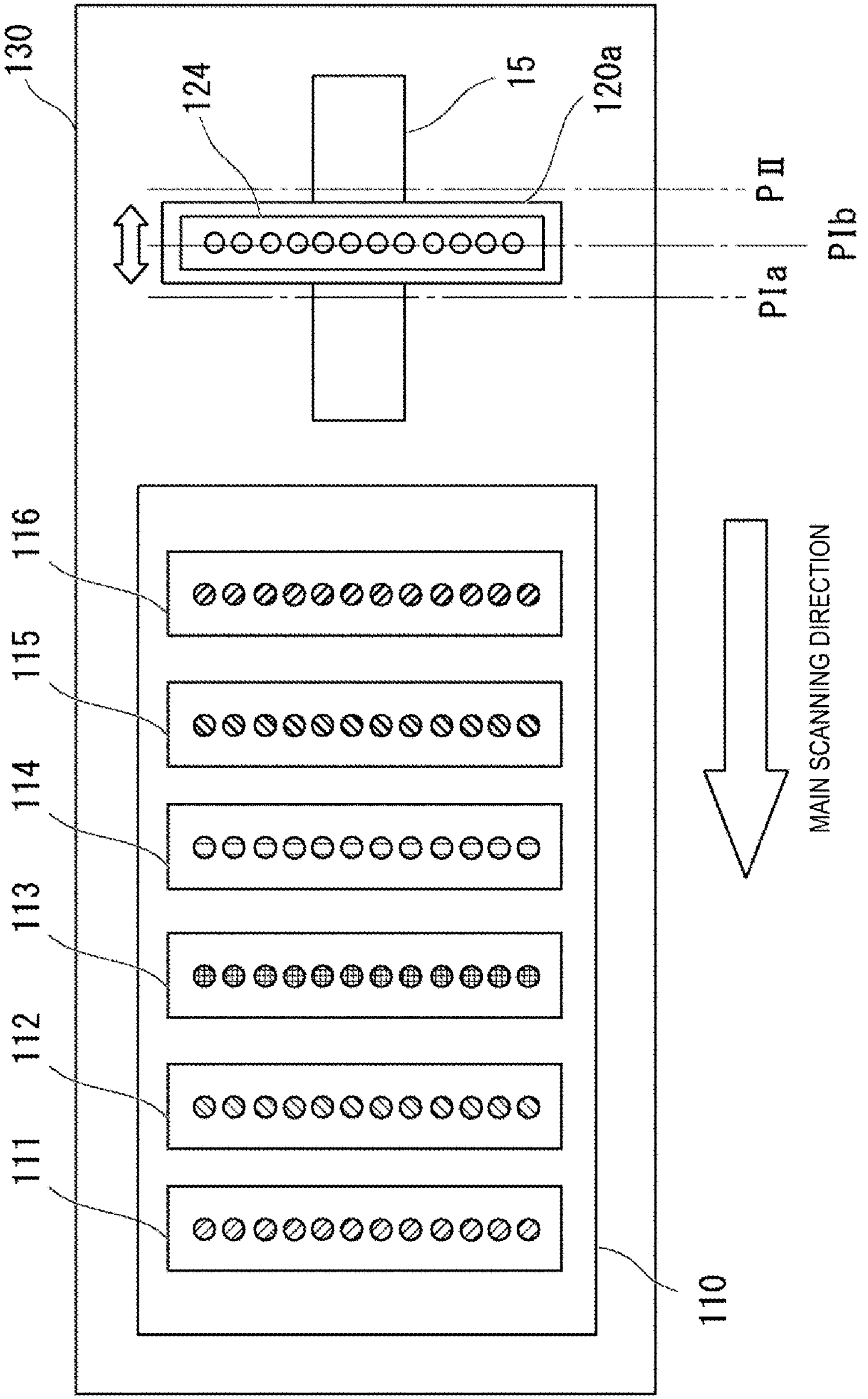
FIG. 4 is a schematic view illustrating another example of a carriage on which the liquid ejecting head and the emission unit in the printing apparatus in FIG. 1 are mounted.

In a case of the light source 120*a* and the changing unit in the example in FIG. 4, only one light source is provided in the main scanning direction. This light source is a movable light source 124. By moving this light source in the main scanning direction, it is possible to vary the distance between the ink ejecting head 110 and the movable light source 124 in a pseudo manner. For example, as illustrated in FIG. 4, the movable light source 124 can be moved to a position PIa at the beginning of the first non-constant velocity period Ia, can be moved to a position PIb at the beginning of the second non-constant velocity period Ib, and can be moved to a position PII at the beginning of the constant velocity period II. Of course, this can be applied to the second non-constant velocity period IIIb and the first non-constant velocity period IIIa. In addition, the movable light source 124 can be gradually moved on the rail 15 during the same period.

Furthermore, in a case of the light source 120*a* and the changing unit in the example in FIG. 4, the movable light source 124 moves along the main scanning direction. Thus, when the ultraviolet light is emitted at the effective output or more, the ultraviolet light can be emitted such that the emission range in the sub-scanning direction is always constant.

As for a change in the distance, in a case of the light source 120*a* and the changing unit in the example in FIG. 4, it is possible to change the distance only to two positions of the first light source 121 and the second light source 122 described with reference to FIG. 2, or to three positions of the first to third light sources 121 to 123. Thus, it can be understood that various application examples, which have been described using the example in FIG. 2, can be applied in the example in FIG. 4.

However, positions may be changeable in more stages. In this case, it is possible to perform finer control as compared with an example in which a plurality of light sources are provided as in FIG. 2. This makes it possible to further reduce a difference in printing quality. Note that it may be possible to provide a mechanism that causes the ink ejecting head 110 side to move in a state where the light source 120*a* is fixed to the carriage 130. However, the accuracy of printing can be more easily improved if the light source 120*a* side is moved.

Furthermore, in the examples described above, description has been made on the assumption that there are two situations concerning controlling when the control unit 10 controls emission of the ultraviolet light from the light source: controlling each of the light sources at the effective output or more; and controlling each of the light sources at less than the effective output.

However, even when the light source of the emission unit 12 is turned on at the effective output or more, the control unit 10 can change the output according to situations. In particular, it may be possible to employ a configuration in which the control unit 10 controls the light source 120 or the light source 120*a* such that the intensity of ultraviolet light when the light source 120 or the light source 120*a* passes above the UV ink ejected from the ink ejecting head 110 during the non-constant velocity period is smaller than the intensity of ultraviolet light when the light source 120 or the light source 120*a* passes above the UV ink ejected from the ink ejecting head 110 during the constant velocity period II.

With such control, the printing apparatus 1 can increase the energy of ultraviolet light emitted in the constant velocity period II when the light source 120 or the light source 120*a* rapidly passes through, and reduce the energy of ultraviolet light emitted in the non-constant velocity period when the light source passes through more slowly than that in the constant velocity period II. By adding such control, it is possible to reduce a difference between periods in the total energy amount that the ejected UV ink receives. This makes it possible to further reduce the difference in the image quality. Such control can be applied to the light source 120 in FIG. 4. In particular, when the example in FIG. 2 is employed, it is possible to provide an effect in which it is possible to reduce the number of light sources of the light source 120 that are disposed at difference distances by controlling the energy of the ultraviolet light.

Figure 5:
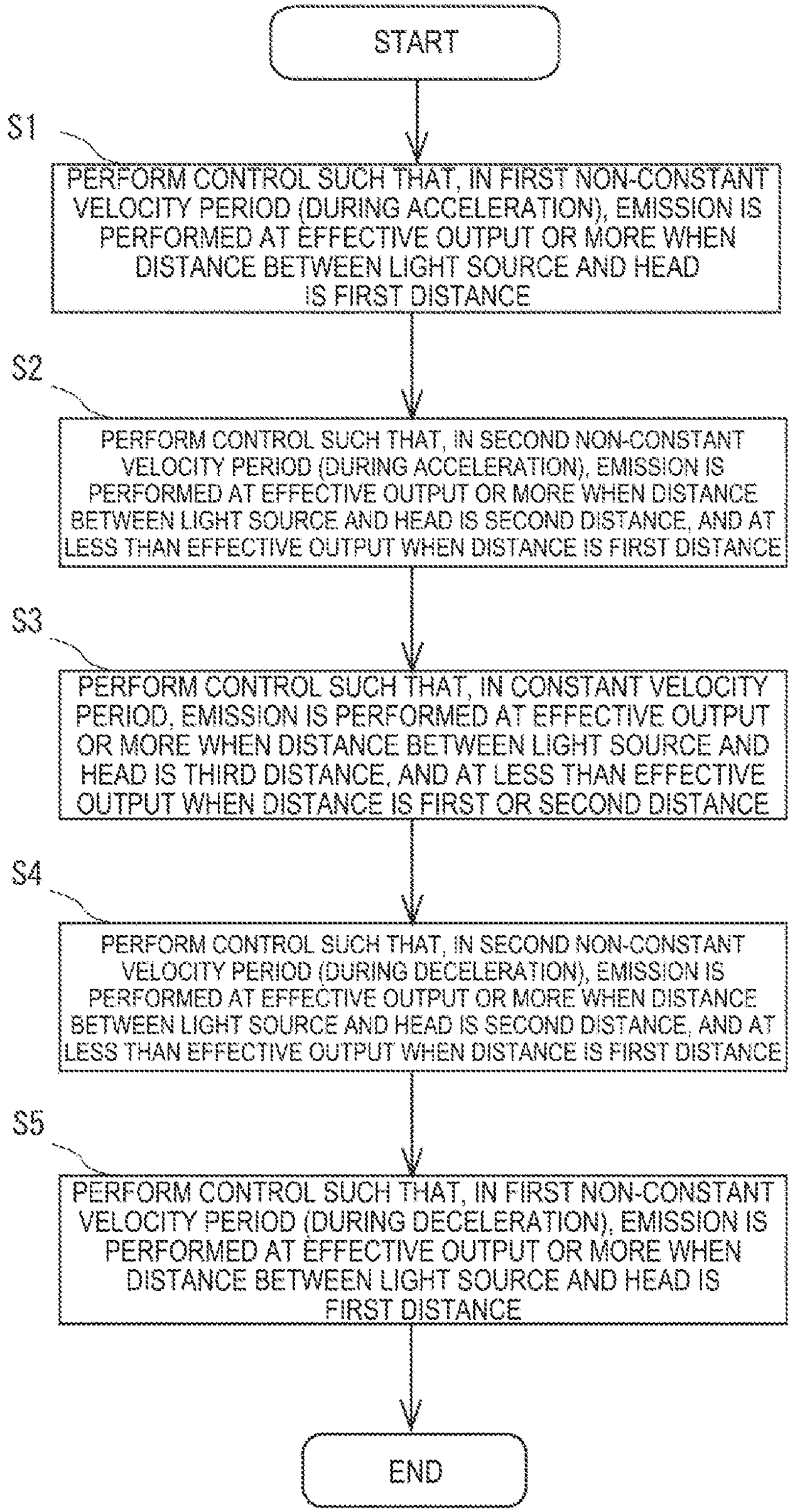
FIG. 5 is a flowchart illustrating one example of an emission operation of the printing apparatus in FIG. 1.

Next, with reference to FIG. 5, description will be made of one example of an emission operation by the printing apparatus 1 in FIG. 1 and an operation during deceleration. FIG. 5 is a flowchart illustrating one example of the emission operation by the printing apparatus 1 and used to explain one example of a method of ejecting a liquid according to the present embodiment. Below, an example of the emission operation will be described based on the example described with reference to FIG. 2.

First, in a case in which, in the first non-constant velocity period Ia, the light source 120 passes above the UV ink ejected from the ink ejecting head 110, the control unit 10 of the printing apparatus 1 performs control such that ultraviolet light is emitted from the light source 120 at the effective output or more when the distance between the ink ejecting head 110 and the light source 120 is the first distance (step S1). In this case, the output of emission at the second or third distance does not substantially affect curing of ejected ink, and hence, there is no limitation thereon.

After this, in a case in which, in the second non-constant velocity period Ib, the light source 120 passes above the UV ink ejected from the ink ejecting head 110, the control unit 10 performs control such that ultraviolet light is emitted from the light source 120 at the effective output or more when the distance between the ink ejecting head 110 and the light source 120 is the second distance, and ultraviolet light is emitted from the light source 120 at less than the effective output when the distance is the first distance (step S2). In this case, the output of emission at the third distance does not substantially affect curing of ejected ink, and hence, there is no limitation thereon.

Then, in a case in which, in the constant velocity period II, the light source 120 passes above the UV ink ejected from the ink ejecting head 110, the control unit 10 performs control such that ultraviolet light is emitted from the light source 120 at the effective output or more when the distance between the ink ejecting head 110 and the light source 120 is the third distance, and ultraviolet light is emitted from the light source 120 at less than the effective output when the distance is the first distance or the second distance (step S3).

Then, in a case in which, in the second non-constant velocity period IIIb, the light source 120 passes above the UV ink ejected from the ink ejecting head 110, the control unit 10 performs control such that ultraviolet light is emitted from the light source 120 at the effective output or more when the distance between the ink ejecting head 110 and the light source 120 is the second distance, and ultraviolet light is emitted from the light source 120 at less than the effective output when the distance is the first distance (step S4). In this case, the output of emission at the third distance does not substantially affect curing of ejected ink, and hence, there is no limitation thereon.

Then, in a case in which, in the first non-constant velocity period IIIa, the light source 120 passes above the UV ink ejected from the ink ejecting head 110, the control unit 10 performs control such that ultraviolet light is emitted from the light source 120 at the effective output or more when the distance between the ink ejecting head 110 and the light source 120 is the first distance (step S5). In this case, the output of emission at the second or third distance does not substantially affect curing of ejected ink, and hence, there is no limitation thereon.

Through these operations, one forward path ends.

The above example of the emission operation has been described based on the example described with reference to FIG. 2, and can be similarly applied to the example described with reference to FIG. 4. In a case of the example described with reference to FIG. 4, in steps S1, S2, S3, S4, and S5, by changing the light source 120*a* to be located at the first distance, the second distance, the third distance, the second distance, and the first distance using the changing unit, conditions concerning other distances are satisfied in each of the steps.

Note that the present disclosure is not limited to the above-described embodiments, and modifications can be made to the above-described embodiments on an as-necessary basis without departing from the spirit and gist of the present disclosure.

For example, description has been made on the assumption that the printing apparatus 1 performs printing only in the forward path in the main scanning direction. However, the printing apparatus 1 can be configured to also perform printing in the returning path. In this case, it is only necessary to employ a configuration in which an emission unit 12 for forward path and an emission unit 12 for the returning path are each provided at a respective one of both sides of the head unit 11 in the main scanning direction; in a case of the forward path, the emission unit 12 for the returning path is not used at least at the effective output or more; and in a case of the returning path, the emission unit 12 for the forward path is not used at least at the effective output or more. In other words, when printing is performed in both the forward path and the returning path, the emission unit 12 may be provided at both sides of the ink ejecting head 110 in the main scanning direction such that emission is performed after ink is ejected.

In addition, description above gives an example in which the emission unit 12 is provided for each head unit 11. However, the configuration is not limited to this. For example, it may be possible to employ a configuration in which an ink ejecting head is provided at the head unit 11 for each color, that is, one ink ejecting head is provided for a nozzle row of one color. In addition, it may be possible to employ a configuration in which at least either of the emission unit 12 for the forward path and the emission unit 12 for the returning path is provided for each ink ejecting head of each color at the head unit 11, that is, for each ink ejecting head of each nozzle row. In this case, the emission unit 12 is provided for each color.

Furthermore, the printing apparatus 1 may include another emission unit provided and fixed downstream of the carriage unit 13 in the transport direction. The other emission unit described above includes a light source having a length that enables ultraviolet light to be emitted at one time over the length or more of the medium in the width direction, and emits the ultraviolet light to the UV ink on the medium. In a configuration in which only the emission unit 12 cannot completely cure the UV ink, the other emission unit can be provided to completely cure the UV ink on the medium.

Furthermore, the program described above includes a group of instructions (or software codes) that cause a computer to execute one or more functions described in the embodiment when read in the computer. The program may be stored in a non-transitory computer-readable medium or a tangible storage medium. By way of example and not limitation, the computer-readable medium or a tangible storage medium includes a random-access memory (RAM), a read-only memory (ROM), a flash memory, a solid-state drive (SSD), or other memory technologies. In addition, by way of example and not limitation, the computer-readable medium or tangible storage medium includes a CD-ROM, a digital versatile disc (DVD), a Blu-ray (trade name) disk, other optical disk storages, a magnetic cassette, a magnetic tape, a magnetic storage, or other magnetic storage device. The program may be transmitted through a transitory computer-readable medium or a communication medium. By way of example and not limitation, the transitory computer-readable medium or a communication medium includes an electrical-type, an optical-type, an acoustical-type, or other types of propagation signal.

These are descriptions of the present disclosure using the embodiment. However, the present disclosure is not limited to the configurations of the embodiments described above. It is needless to say that the present disclosure includes various types of modifications, corrections, and combinations that the skilled person in the art could make within the scope of the claimed disclosure in Claims according to the present application.

What is claimed is:

1. A liquid ejecting device comprising:

a liquid ejecting head configured to eject a liquid to a medium;

an emission unit configured to move, together with the liquid ejecting head, in a main scanning direction relative to the medium, and emit an active energy beam toward the medium; and a control unit configured to control emission of the active energy beam from the emission unit, wherein a non-constant velocity period represents a period in which a relative velocity of the liquid ejecting head and the emission unit in the main scanning direction relative to the medium changes, the non-constant velocity period includes a first non-constant velocity period, and a second non-constant velocity period in which the relative velocity is faster than the relative velocity in the first non-constant velocity period, when emitting the active energy beam at not less than an effective output, the emission unit emits the active energy beam such that an emission range in a sub-scanning direction intersecting the main scanning direction is constant, in a case in which, in the first non-constant velocity period, the emission unit passes above the liquid ejected from the liquid ejecting head, the control unit performs control such that the active energy beam is emitted from the emission unit at not less than an effective output when a distance between the liquid ejecting head and the emission unit is a first distance, and in a case in which, in the second non-constant velocity period, the emission unit passes above the liquid ejected from the liquid ejecting head, the control unit performs control such that the active energy beam is emitted from the emission unit at not less than an effective output when the distance between the liquid ejecting head and the emission unit is a second distance longer than the first distance, and the active energy beam is emitted from the emission unit at less than an effective output when the distance is the first distance.

2. The liquid ejecting device according to claim 1, further comprising a changing unit configured to change a distance between the liquid ejecting head and the emission unit in the main scanning direction, wherein controlling emission of the active energy beam from the emission unit includes controlling the changing unit.

3. The liquid ejecting device according to claim 1, wherein the emission unit includes:

a first emission unit located at the first distance from the liquid ejecting head in the main scanning direction and a second emission unit located at the second distance from the liquid ejecting head in the main scanning direction.

4. The liquid ejecting device according to claim 3, wherein the emission unit further includes a third emission unit located at a third distance from the liquid ejecting head in the main scanning direction, the third distance being longer than the first distance and the second distance, in the first non-constant velocity period, the control unit performs control such that the active energy beam at not less than the effective output is emitted at least from the first emission unit, in the second non-constant velocity period, the control unit performs control such that the active energy beam at not less than the effective output is not emitted from the first emission unit, and is emitted at least from the second emission unit, and in a constant velocity period in which the relative velocity is constant, the control unit performs control such that the active energy beam at not less than the effective output is emitted from the third emission unit.

5. The liquid ejecting device according to claim 1, wherein the control unit controls the emission unit such that an intensity, in the non-constant velocity period, of the active energy beam when the emission unit passes above the liquid ejected from the liquid ejecting head is smaller than an intensity, in a constant velocity period, of the active energy beam when the emission unit passes above the liquid ejected from the liquid ejecting head, the constant velocity period being a period in which the relative velocity is constant.

6. A liquid ejecting method of ejecting a liquid using a liquid ejecting device, the liquid ejecting device including:

a liquid ejecting head configured to eject a liquid to a medium and an emission unit configured to move, together with the liquid ejecting head, in a main scanning direction relative to the medium, and emit an active energy beam toward the medium, the emission unit being a unit configured such that, when emitting the active energy beam at not less than an effective output, the emission unit emits the active energy beam such that an emission range in a sub-scanning direction intersecting the main scanning direction is constant, a non-constant velocity period representing a period in which a relative velocity of the liquid ejecting head and the emission unit in the main scanning direction relative to the medium changes, the non-constant velocity period including a first non-constant velocity period, and a second non-constant velocity period in which the relative velocity is faster than the relative velocity in the first non-constant velocity period, the liquid ejecting method comprising:

in a case in which, in the first non-constant velocity period, the emission unit passes above the liquid ejected from the liquid ejecting head, performing control such that the active energy beam is emitted from the emission unit at not less than an effective output when a distance between the liquid ejecting head and the emission unit is a first distance; and in a case in which, in the second non-constant velocity period, the emission unit passes above the liquid ejected from the liquid ejecting head, performing control such that the active energy beam is emitted from the emission unit at not less than an effective output when the distance between the liquid ejecting head and the emission unit is a second distance longer than the first distance, and the active energy beam is emitted from the emission unit at less than an effective output when the distance is the first distance.

* * * * *